United States Patent
Marko

(10) Patent No.: US 6,478,870 B2
(45) Date of Patent: Nov. 12, 2002

(54) PROCESS AID FOR PREPARING A FLOWABLE SLURRY

(75) Inventor: Ollie William Marko, Milton, KY (US)

(73) Assignee: Dow Corning Corporation, Midland, MI (US)

(*) Notice: Subject to any disclaimer, the term of this patent is extended or adjusted under 35 U.S.C. 154(b) by 0 days.

(21) Appl. No.: 09/909,163

(22) Filed: Jul. 19, 2001

(65) Prior Publication Data

US 2002/0033121 A1 Mar. 21, 2002

Related U.S. Application Data

(63) Continuation-in-part of application No. 09/492,659, filed on Jan. 27, 2000, now abandoned.

(51) Int. Cl.$^7$ .............................. C04B 7/44; C04B 24/40
(52) U.S. Cl. ..................... 106/745; 106/819; 106/823; 106/600; 106/606; 106/632; 106/638; 106/713; 106/802
(58) Field of Search ................................ 106/819, 823, 106/600, 606, 632, 638, 713, 802, 745

(56) References Cited

U.S. PATENT DOCUMENTS

| 2,687,290 A | 8/1954 | Garoutte et al. ............... 263/53 |
| 2,900,266 A | 8/1959 | Shaver ........................ 106/100 |
| 3,346,487 A | 10/1967 | Irani et al. .................... 252/8.5 |
| 3,935,124 A | 1/1976 | Thene et al. ................. 252/382 |
| 4,115,139 A | 9/1978 | Every et al. ................. 106/100 |
| 4,267,197 A | 5/1981 | Sawhill ........................ 426/69 |
| 4,408,030 A | 10/1983 | Marko ........................ 528/10 |
| 5,000,934 A | 3/1991 | Marko et al. ................ 423/335 |
| 5,374,310 A | 12/1994 | Bunce et al. ................ 106/739 |
| 5,551,806 A * | 9/1996 | Milliken ...................... 106/710 |
| 5,578,219 A | 11/1996 | Kajita ......................... 210/730 |
| 5,612,269 A | 3/1997 | Suzuki ......................... 502/62 |
| 5,897,946 A * | 4/1999 | Nachtman et al. ............ 405/17 |
| 6,090,197 A | 7/2000 | Vivian et al. ................ 106/739 |
| 6,166,119 A | 12/2000 | Matsuo et al. ............... 524/376 |

FOREIGN PATENT DOCUMENTS

| CN | 1032331 | 4/1989 | ............. C04B/7/42 |
| CN | 1038081 | 12/1989 | ............. C04B/7/42 |
| JP | 1270568 | 10/1989 | ........... C04B/35/18 |
| JP | 8081214 | 3/1996 | ............ C01B/33/44 |
| JP | 10167786 | 6/1998 | ........... C04B/24/02 |
| JP | 002186198 | 5/2000 | |
| RU | 2122984 | 12/1998 | ............. C04B/7/36 |
| WO | WO 044487 | 8/2000 | ........... B01F/17/56 |

OTHER PUBLICATIONS

"Admixtrues and special uses of cements", Cement Chemistry, By H.F. W. Taylor, Copyright 1990, Chapter 11, pp. 345–351.

* cited by examiner

*Primary Examiner*—Elizabeth D. Wood
(74) *Attorney, Agent, or Firm*—Rogerr E. Gobrogge; Jennifer S. Warren; Jim L. De Cesare

(57) ABSTRACT

A process for preparing a flowable slurry comprising mixing 25–70 wt. % water; an alkaline material selected from the group consisting of chlorosilicon manufacturing byproducts, direct process residue gels, cement kiln dust, and mixtures thereof; and a process aid selected from the group consisting of sucrose, raffinose, lignin, methylglucopyranoside, lactose, fructose, sodium polyphosphate, trehalose and mixtures thereof to form a flowable slurry. This slurry is especially useful in the manufacture of cement.

5 Claims, No Drawings

PROCESS AID FOR PREPARING A FLOWABLE SLURRY

This is a continuation-in-part of application Ser. No. 09/492,659, filed Jan. 27, 2000.

BACKGROUND OF INVENTION

The present invention is a process for preparing a flowable slurry comprising mixing an alkaline material selected from the group consisting of chlorosilicon manufacturing byproducts, direct process residue gels, cement kiln dust and mixtures thereof, optionally clay, about 25 to 70 wt. % water and a process aid selected from the group consisting of sucrose, raffinose, lignin, methylglucopyranoside, lactose, fructose, sodium polyphosphate, trehalose and mixtures thereof to form the flowable slurry. The process is especially useful as an economical and an environmentally sound method for recycling alkaline raw materials for cement manufacture.

The preparation of portland cement is well known in the art. Portland cement is a hydraulic cement characterized by the ability to set and harden in water. Generally, portland cement is manufactured by mixing suitable raw materials with water, burning at suitable temperatures to effect clinker formation, and grinding the resulting clinkers to the fineness required for hardening by reaction with water. The burning operation generates a fine alkaline particulate byproduct called cement kiln dust that is difficult to recycle. Cement kiln dust typically comprises about 1–3 wt. % or more of the above product from the cement production operation.

The portland cement resulting from the above process consists mainly of tricalcium silicate and dicalcium silicate. These two materials are primarily derived from two raw materials: one rich in calcium such as limestone, chalk, marl, oyster or clam shells; and the other rich in silica such as clay, shale, sand or quartz.

Bunce, et. al in U.S. Pat. No. 5,374,310 teach the use of a silicon containing product resulting from the hydrolysis of chlorosilicon by-product as materials for cement production. However, when such materials are added to a clay slurry for use in cement manufacture, a thick, non-flowable paste forms which prevents further downstream processing, especially when small amounts of water are used.

It would also be useful to use other alkaline materials such as other chlorosilicon manufacturing byproducts and cement kiln dust in the manufacture of cement. Unfortunately, these materials, too, suffer from the disadvantage that they form thick pastes that are difficult to manage unless large amounts of water are used.

The present inventors have now discovered that flowable slurries of such alkaline materials can be maintained by mixing them with certain process aids selected from the group consisting of sucrose, raffinose, lignin, methylglucopyranoside, lactose, fructose, sodium polyphosphate, trehalose and mixtures thereof.

SUMMARY OF INVENTION

The present invention is a process for preparing a flowable slurry comprising mixing:
  25–70 wt. % water;
  an alkaline material selected from the group consisting of chlorosilicon manufacturing byproducts, direct process residue gels, cement kiln dust and mixtures thereof;
  optionally, clay; and
  a process aid selected from the group consisting of sucrose, raffinose, lignin, methylglucopyranoside, lactose, fructose, sodium polyphosphate, trehalose and mixtures thereof
  to form a flowable slurry.

DETAILED DESCRIPTION OF INVENTION

The present invention is a process for preparing a flowable slurry comprising an alkaline material, a process aid, optionally clay and water. The process aid inhibits the formation of thick pastes that result when the alkaline material and, optionally, clay are mixed with water.

The alkaline materials useful herein comprise chlorosilicon manufacturing byproducts, direct process residue gels, cement kiln dust, and mixtures thereof.

The "chlorosilicon manufacturing by-products" result from manufacturing operations in which chlorosilicons are produced. Typical of chlorosilicon manufacturing operations are the reaction of silicon metal with methyl chloride to form methyl chlorosilanes and the reaction of silicon metal with hydrogen chloride to produce chlorosilanes. Unfortunately, these operations produce a number of undesirable by-products and waste streams that require disposal.

These by-products and waste streams are often acidic and, thus, are often neutralized prior to use. An example of one such neutralization method is described in U.S. Pat. No. 5,000,934, in which a spent bed resulting from the reaction of halides with silicon metal is neutralized with a strong base and elevated temperature. This reference is incorporated herein by reference. The metal salts that are generated by processes such as this or other by-product disposal processes, as well as any other incidental metal salts generated by chlorosilicon production processes which will be known to those with ordinary skill are generally captured to avoid discharge to the environment and can be used in the process of the present invention.

A specific example of a by-product useful in the process of the present invention comprises that generated by the metal hydroxide precipitation during the purification of wastewater from chlorosilicon manufacturing.

The by-products resulting from these processes may comprise metal oxides, such as $CaO$, $SiO_2$, $Al_2O_3$, $Fe_2O_3$, $MgO$, $K_2O$, $Na_2O$, $SO_3$, $TiO_2$, $P_2O_5$, $SrO$, $BaO$, and $Mn_3O_4$. While the actual composition is not critical to the invention, typical chemical compositions of the by-product from the example of the previous paragraph may comprise 0 to 30 wt. % $CaO$, 0 to 35 wt. % $SiO_2$, 0 to 5 wt. % $Al_2O_3$, 0 to 4 wt. % $Fe_2O_3$, 0 to 8 wt. % $MgO$, 0 to 1 wt. % $K_2O$, 0 to 0.5 wt. % $Na_2O$, 0 to 1 wt. % $SO_3$, 0 to 1 wt. % $TiO_2$, 0 to 0.1 wt. % $P_2O_5$, 0 to 0.1 wt. % $SrO$, 0 to 0.1 wt. % $BaO$, 0 to 0.5 wt. % $Mn_3O_4$ and 0 to 30 wt. % water.

Another alkaline material useful in the present invention is direct process residue gel. Examples of this material are described in U.S. Pat. Nos. 4,408,030 and 5,374,310, which are incorporated herein by reference. These references describe the formation of gels from the by-products of the reaction of silicon metal with methyl chloride to produce chlorosilanes (the 'direct process'). The gels are formed by the hydrolysis of a variety of these chlorosilion by-products including, for example, silanes, disilanes, disiloxanes, silane oligomers, siloxane oligomers, silphenylenes and silalkylenes. This hydrolysis occurs in an aqueous medium as described in the above patents, which may comprise additives such as HCl and/or $CaCl_2$.

A typical composition of this gel comprises water, $CaCl_2$, and the hydrolyzed products of the hydrolysis.

Also useful as alkaline materials in the present invention are other calcium rich materials, such as, cement kiln dust which, as described above, is a by-product generated during Portland cement manufacturing operations. Generally, Portland cements are manufactured by mixing suitable raw materials with water, burning at suitable temperatures to effect clinker formation, and grinding the resulting clinkers to the fineness required for hardening by reaction with water. The burning operation generates the fine alkaline particulate, cement kiln dust. While the actual composition is not critical to the invention, typical chemical compositions for cement kiln dust are in the range of about 15 to 55 wt. % CaO, 10 to 35 wt. % $SiO_2$, 2 to 10 wt. % $Al_2O_3$, 1 to 6 wt. % $Fe_2O_3$, 1 to 11 wt. % MgO, 0.2 to 2 wt. % $K_2O$, 0.05 to 1.0 wt. % $Na_2O$, and 0.1 to 2 wt. % $SO_3$.

The alkaline materials are typically added to the slurry of the present invention in amounts up to about 40 wt. % based on the total weight of the slurry when clay is present, and up to about 65% when clay is not part of the slurry. Often, the alkaline materials are used in amounts up to about 30 wt. % or, alternatively, about 1 to 30 wt. %, based on the total weight of the slurry when clay is included, and up to about 60 wt. % or, alternatively, 0.1 to 60 wt. %, when clay is not part of the slurry. Obviously, smaller amounts are also within the scope of the invention.

The process aids used in the present invention are selected from the group consisting of sucrose, raffinose, lignin, methylglucopyranoside, lactose, fructose, sodium polyphosphate, trehalose and mixtures thereof. These materials are all known in the art and readily commercially available. Preferably, the process is selected from the group consisting of sucrose, lignin, fructose and mixtures thereof. It should be noted that the use of precursors for these process aids as well as compositions containing these process aids are within the scope of this invention.

The amount of process aid used in the present invention depends on the other components used (i.e., the alkaline material used, the clay, and the water) as well as the quantities thereof. Generally, however, the process aid is used in an amount of from about 0.02 to about 10 wt. %, alternatively about 0.02 to about 5 wt. %, based on the weight of the slurry. Alternatively, the amount of process aid is within the range of about 0.05 to 1 wt. %.

The slurry of the present invention can also contain a clay. Clay is often included because clay slurries are a feedstock for cement manufacture and incorporating the alkaline material in clay slurry is a convenient method for introducing the alkaline material into the cement production process. While the type of clay utilized herein is not critical to the invention, typical examples include montmorillonite clay which comprises magnesium aluminum silicates suspended in water, often in suspensions of about 25–65% montmorillonite clay in water. Such clay suspensions are commercially available. Other clays, however, are also useful herein.

If used, the clay is usually added to the slurry of the present invention in amounts of about 1–65 wt. % clay solids, often above about 40 wt. %, alternatively above about 45wt. %, based on the total weight of the clay solids in the slurry.

Water is also a component of the slurry. Typically it is included in the slurry in amount of from about 25 to about 70 wt. %, alternatively from about 30 to about 55 wt. % based on the weight of the slurry. Values above 70% can be used, but the volume of water that needs to be removed in the calcining process becomes so large that it is economically prohibitive to boil it away due to fuel costs.

It should be noted that the above alkaline materials may make up all or only a portion of the calcium and silica requirements of Portland cement. As such, other alkaline, calcium and/or silica-containing materials can be added to the invention.

The order and method of mixing the components is not critical to the invention. For example, all of the components of the slurry can be mixed at the same time. Alternatively, the process aid can be mixed with a mixture of the water, alkaline material and optional clay, even after a thick paste has formed. Similarly, the alkaline material and optional clay can be mixed with aqueous solutions of the process aid.

These materials can be mixed by conventional mixing techniques and conventional mixing equipment such as, but not limited to, rod mills, pan mills pug mills, other single or multi-shaft mixers.

When the process aids of the invention are incorporated in slurries of the materials described herein, the slurries remain flowable and, thus, processable in cement manufacturing operations. Thus, not only are there significant savings in raw material costs in cement manufacturing, but this process eliminates costs associated with disposing cement kiln dust and it provides a means for recycling wastes associated with chlorosilane manufacturing operations.

The above slurries can be used in the manufacture of portland cement. This is generally accomplished by burning the slurries at suitable temperatures to effect clinker formation, and grinding the resulting clinkers to the fineness required for hardening when reacted with water.

The following examples are provided to illustrate the present invention. These examples are not intended to limit the scope of the claims herein.

EXAMPLE 1

50 grams of a 35 wt. % suspension of montmorillonite clay in water was placed in a glass jar and the sample spiked with 2.5 grams of CaO. The jar contents were hand shaken for about 1 to 2 minutes until the clay slurry thickened into a non-flowable paste. Sucrose (0.06 wt. % of the above mixture) was added to the jar and the contents were stirred and the non-flowable paste thinned into a flowable paste.

EXAMPLE 2

Runs were conducted using the procedure of Example 1, with the exception that the process aid and process aid amount were varied. The process aid, process aid amount added to the clay slurry, and the clay slurry flow characteristics after the process aid addition are reported in Table 1.

The following method was used to provide flowability measurements of Table 1:

A ring stand with a clamp is used to secure a 10"×11" cutting board covered with teflon paper at a thirty degree angle. Tape is used to mark a distance of 15 cm. from the bottom of the board. A collection dish is positioned at the bottom of the board. The ambient temperature is recorded. For consistency, the room temperature should be between 68° and 72° F.

The sample is mixed well and weighed. The sample is quickly poured onto the teflon surface at the 15 cm. tape line and a stopwatch is simultaneously started. The collection dish is removed after one minute and the amount of sample recovered weighed. The percent of the sample recovered is then calculated.

TABLE 1

| PROCESS AID | FLOW CHARACTERISTICS | | | | | |
|---|---|---|---|---|---|---|
| wt. % | 1.0 | 0.5 | 0.25 | 0.13 | 0.06 | 0.03 |
| Sucrose | flowable, watery | flowable, watery | flowable, watery | flowable, less watery | thicker paste, flowable | non-flowable paste |
| D(+)-Raffinose | flowable, watery | flowable, watery | flowable, watery | flowable, less watery | thick paste, still flows | thick paste, minimal flow |
| Lignin | flowable, watery | flowable, watery | flowable, watery | thick paste still flows | thick paste still flows | thick paste still flows |
| (NaPO$_3$)$_n$ | thick paste still flows | flowable, watery | flowable, watery | thick paste minimal flow | non-flowable paste | non-flowable paste |
| Methyl-α-D-glucopyranoside | flowable, watery | flowable, watery | thick paste, minimal flow | non-flowable paste | — | — |
| D(+) Trehalose | flowable, watery | flowable, watery | thick paste minimal flow | non-flowable paste | — | — |
| α-Lactose | flowable, watery | flowable, watery | thick paste still flows | thick paste minimal flow | non-flowable paste | — |
| D(−) Fructose | very thin flowable, watery | very thin flowable, watery | flowable, watery | thick paste still flows | thick paste minimal flow | non-flowable paste |

Table Key
"Flowable, watery" (very thin) = Flows out of jig before measurement can begin
"Flowable, watery" = moves 4 inches in 10 seconds or less
"Flowable, less watery" = moves 3.0 to 3.9 inches in 10 seconds
"Thick paste, still flows" = moves 1.0 to 2.9 inches in 10 seconds
"Thick paste, minimal flow" = moves 0.1 to 0.9 inches in 10 seconds
"Non-flowable paste" = No flow in 10 seconds

EXAMPLE 3

50 grams of a 35 wt. % suspension of montmorillonite clay in water was placed in a glass jar and the sample spiked with an additional 10 wt. % chlorosilicon manufacturing byproducts. The jar contents were hand shaken for about 1 to 2 minutes until the clay slurry thickened into a non-flowable paste. Sucrose (0.25 wt. % of mixture) was added to the jar and the contents were stirred. The non-flowable paste reverted back into a flowable watery clay slurry as defined in Table 1.

EXAMPLE 4

50 grams of a 35 wt. % suspension of montmorillonite clay in water was placed in a glass jar and the sample was mixed with chlorosilicon manufacturing byproducts (10 wt. %) spiked with sucrose (0.25 wt. % of final mixture). The jar contents were hand shaken for about 1 to 2 minutes and the clay slurry remained flowable and watery as defined in Table 1.

EXAMPLE 5

Chlorosilicon manufacturing byproducts (10 wt. %) was added to a jar containing a 35 wt. % suspension of montmorillonite clay in water which was spiked with 0.25 wt. % sucrose. The jar contents were hand shaken for about 1 to 2 minutes and the clay slurry remained flowable and watery as defined in Table 1.

EXAMPLE 6

Various mixtures of alkaline materials were prepared in a slurry form with water and other materials as listed in Table 2. A 63 wt. % suspension of clay in 37 wt. % water was prepared to mimic a cement kiln feedstock. This material is named "clay slip" in Table 2 (and by the cement industry). The ingredients were mixed in the proportions shown in Table 2, along with an amount of sucrose process aid expressed as a weight percentage of the mixture. The ingredients were mixed together and poured into the Ford Viscosity Cup with the orifice outlet blocked. The outlet was opened and the material drained out of the cup into a container below. The time required for the contents of the cup to drain was recorded. A table accompanying the Ford Viscosity Cup is used to correlate the drain times of each cup with the viscosity of the mixture in centistokes (cSt). The Ford Cup (Catalog VG-7200 series, available from BYK Gardner) is a cylindrical container with a cone-shaped bottom with a volume of approximately 100 ml. An orifice is located in the center at the bottom of the cylinder. There are three different Ford Viscosity Cups based upon the size of the orifice on the bottom and each cup is calibrated to NIST-traceable oils. (Two different cups, #2 and #3, were used for Example 6.) In each mixture where the alkaline material content is sufficiently low, the process aid is able to reduce the mixture viscosity from not flowable or high viscosity to lower viscosity.

TABLE 2

Viscosity Measurement at Various Process Aid Concentrations:

| Components in Mixture | Ratio | Amount of Process Aid (wt %) | Ford Viscosity Cup Number | Viscosity (cSt) |
|---|---|---|---|---|
| Clay Slip | | 0.00% | 3 | <27 |
| Clay Slip/Filtercake | 80/20 | 0.00% | 3 | 77 |
| Clay Slip/Filtercake | 70/30 | 0.00% | 3 | No Flow |
| | | 0.10% | 3 | No Flow |
| | | 0.25% | 3 | 59 |
| | | 0.50% | 3 | 47 |
| | | 0.75% | 3 | <47 |
| | | 1.00% | 3 | <47 |
| Clay Slip/Filtercake | 60/40 | 0.00% | 3 | No Flow |
| | | 0.10% | 3 | No Flow |
| | | 0.25% | 3 | No Flow |
| | | 0.50% | 3 | 100 |
| | | 0.75% | 3 | 77 |
| | | 1.00% | 3 | 68 |
| CKD/Water | 70/30 | 0.00% | 3 | No Flow |
| | | 0.10% | 3 | No Flow |
| | | 0.50% | 3 | No Flow |
| | | 0.75% | 3 | No Flow |
| | | 1.00% | 3 | No Flow |
| CKD/Water | 60/40 | 0.00% | 3 | No Flow |
| | | 0.03% | 3 | 124 |
| | | 0.10% | 3 | 102 |
| | | 0.30% | 3 | 84 |
| | | 0.50% | 3 | 77 |
| | | 0.75% | 3 | 73 |
| | | 1.00% | 3 | 77 |
| Clay Slip/CKD | 70/30 | 0.00% | 3 | No Flow |
| | | 0.03% | 3 | 61 |
| | | 0.10% | 3 | 47 |
| | | 0.50% | 2 | 27 |
| | | 0.75% | 2 | <26 |
| | | 1.00% | 2 | <26 |
| Clay Slip/CKD | 60/40 | 0.00% | 3 | No Flow |
| | | 0.10% | 3 | >220 |
| | | 0.50% | 3 | >220 |
| | | 0.75% | 3 | >220 |
| | | 1.00% | 3 | >220 |

"Clay Slip" is a water clay slurry. Its water content is 37%
"Filtercake" is a chlorosilicon manufacturing byproduct which has been dewatered in a filtration press. This material contains about 47% water.
"CKD" is cement kiln dust
"Ford Viscosity Cup" is a purchased device for viscosity measurement (calibrated cup with a hole in the bottom)
"cSt" is centiStokes, a unit of viscosity That which is claimed is:

1. A process for preparing a flowable slurry comprising mixing (i) 25–70 weight percent of water based on the weight of the slurry; (ii) an alkaline material selected from the group consisting of chlorosilicon manufacturing byproducts, direct process residue gels, cement kiln dust, and mixtures thereof; and (iii) a process aid selected from the group consisting of sucrose, raffinose, methylglucopyranoside, lactose, fructose trehalose, and mixtures thereof; to form the flowable slurry.

2. The process according to claim 1 wherein (iv) clay is mixed into the slurry.

3. A flowable slurry comprising (i) 25–70 weight percent of water based on the weight of the slurry; (ii) an alkaline material selected from the group consisting of chlorosilicon manufacturing byproducts, direct process residue gels, cement kiln dust, and mixtures thereof; (iii) a process aid selected from the group consisting of sucrose, raffinose, methylglucopyranoside, lactose, fructose, trehalose, and mixtures thereof.

4. A process for manufacturing portland cement comprising (a) burning the flowable slurry of claim 3 effect clinker formation; and (b) grinding the clinker to a fineness for hardening when reacted with water.

5. In a process for manufacturing a flowable slurry containing (i) water and (ii) an alkaline material selected from the group consisting of chlorosilicon manufacturing byproducts, direct process residue gels, cement kiln dust, and mixtures thereof; the improvement comprising adding to the slurry (iii) a process aid selected from the group consisting of sucrose, raffinose, methylglucopyranoside, lactose, fructose, trehalose, and mixtures thereof.

* * * * *